Figure 3:
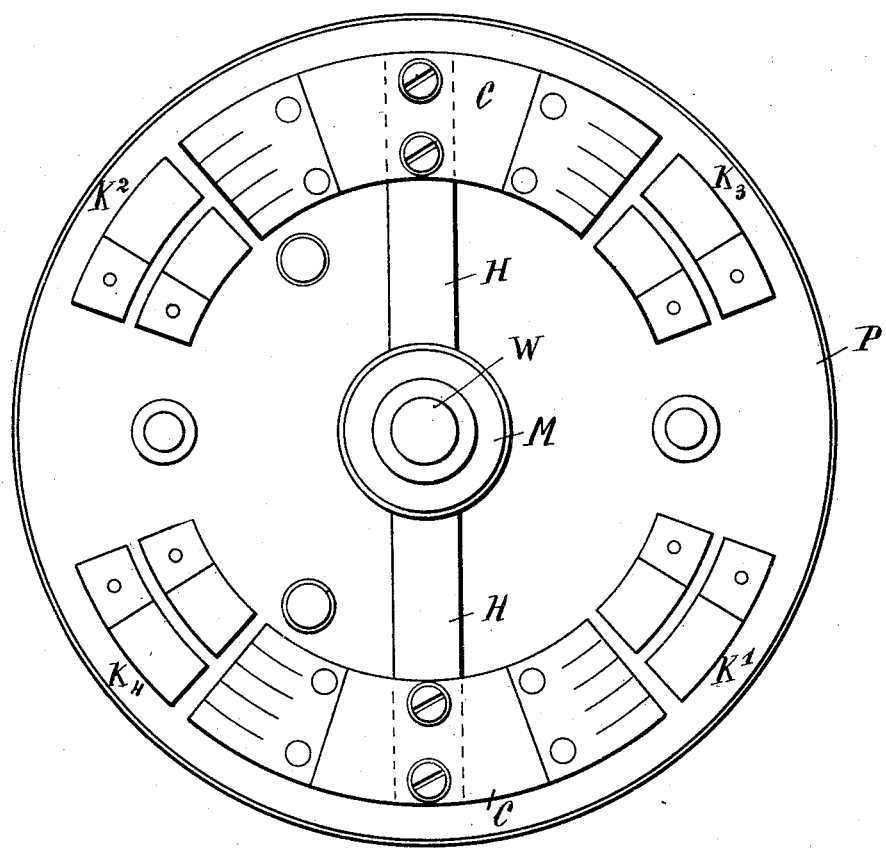

No. 704,575. Patented July 15, 1902.
R. PINTSCH.
CENTRIFUGAL COUPLING.
(Application filed Nov. 14, 1901.)
(No Model.) 2 Sheets—Sheet 1.
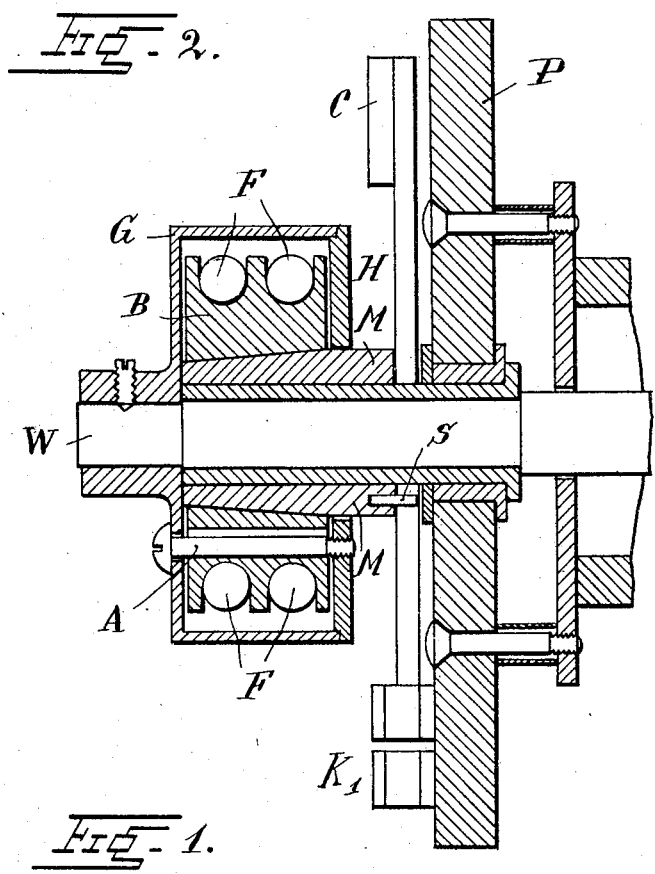
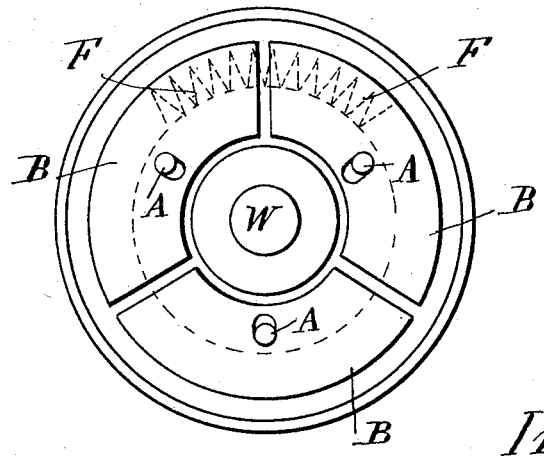
Witnesses:—
Inventor:—
Richard Pintsch
by Eustace W. Hopkins
Atty.

No. 704,575. Patented July 15, 1902.
R. PINTSCH.
CENTRIFUGAL COUPLING.
(Application filed Nov. 14, 1901.)
(No Model.) 2 Sheets—Sheet 2.

Witnesses:—

Inventor:—
Richard Pintsch
by Eustace W. Hopkins
Atty.

UNITED STATES PATENT OFFICE.

RICHARD PINTSCH, OF BERLIN, GERMANY.

CENTRIFUGAL COUPLING.

SPECIFICATION forming part of Letters Patent No. 704,575, dated July 15, 1902.

Application filed November 14, 1901. Serial No. 82,178. (No model.)

*To all whom it may concern:*

Be it known that I, RICHARD PINTSCH, a subject of the Emperor of Germany, and a resident of Berlin, Empire of Germany, have invented a certain new and useful Improved Centrifugal Coupling, of which the following is a full, clear, and exact description.

The centrifugal coupling forming the object of the present invention is designed to come into operation only when the driving-shaft is rotating slowly and to become disengaged automatically as soon as the said shaft exceeds a certain predetermined speed of rotation.

In order to render the present specification easily intelligible, reference is had to the accompanying drawings, in which similar letters of reference denote similar parts throughout the several views.

Figure 1 is a face view of the coupling; Fig. 2, a longitudinal section through the same, and Fig. 3 represents a contact-board which may be operated by the said coupling.

Fast to the driving-shaft W is a housing G, having therein the clamping-cheeks B, which may be three or more or less in number, the said cheeks being attached to the housing and rotating therewith. Bolts A are employed to couple the cheeks B to the housing, and the said bolts lie in slots of the cheeks, so that the latter are capable of radial motion toward and from the driven member M, extending into the housing between the cheeks. The cheeks are drawn together to clamp the driven member M by means of springs F or other suitable means, and the operation, which will be readily understood, is that as soon as the driving-shaft rotates with sufficient speed to produce more centrifugal force than the strength of the springs can withstand the clamping-cheeks fly outward, overcoming the tension of the spring, and thus uncouple the driven member from the driving member.

The coupling might be constructed in a variety of ways, the above being merely one embodiment of the invention, and it will readily be understood that the coupling might also be provided with a regulating device, so that it might be easily adjusted to different speeds.

The housing G will have to be dust-tight and may, if necessary, be filled with oil. The coupling may be employed for a variety of purposes—such, for instance, as electric mine-exploders, in connection with which it is desirable that the shaft driven shall be uncoupled as soon as the speed of the same has reached a sufficient height to effect the ignition.

The above coupling may also be advantageously employed for a driven shaft which is to be rotated at the starting of a machine only—*i. e.*, before the driving-shaft has attained full speed—and one adaptation of the coupling in this manner will be described with reference to Figs. 2 and 3. Assuming a constant-current-generating machine to be driven by the shaft W and that on reversing the direction of rotation of the driving-shaft the poles of the generating-machine are changed, if a machine of this class supplies current to electrically-operated devices for any desired purpose, which do not, however, admit of a change of pole or of the direction of flow of the electric current, it will be necessary to insert a contact-board to reverse the poles on a reversal of the direction of rotation of the driving-shaft, said board being arranged between the current-generating machine and the feed-conductors. By means of the present coupling the pole-changing device may be operated automatically. A lever H may be keyed by a pin S or other suitable means to the driven part M of the shaft, the said lever carrying contacts at each end, as indicated at C C, each contact being in conductive connection with one of the poles of the current-generating machine. P is a stationary contact board or plate having four contacts $K'$ $K^2$ $K^3$ $K^4$, which are arranged so that the contacts of lever H either establish contact at $K'$ and $K^3$ or at $K^2$ and $K^4$, according to the direction of rotation of the shaft W. Thus whatever the direction of rotation of the driving-shaft the flow of the current will always be in the same direction, being retained constant by the change of poles on a change of direction of rotation. It will thus be readily understood in this adaptation the present coupling offers the advantage that the contacting parts of the coupling will only be operative at the beginning of rotation, and that thus the coupling will not be subjected to any wear and tear other than what is absolutely necessary.

I claim as my invention—

1. In a coupling the combination of a housing fast to the driving-shaft, a series of coupling-cheeks mounted to move radially within said housing, springs circumferentially surrounding said cheeks and resiliently maintaining contact between said cheeks and a driven member; a contact-board having two pairs of contacts a lever oscillatably mounted on the driven member and having contacts at either end, said lever-contacts being adapted to reverse the poles of the current on the reversal of the direction of rotation of the driving-shaft in the manner and for the purpose substantially as described.

2. In a coupling, the combination of a housing keyed to the driving-shaft; a series of cheeks forming radial segments of a cylinder and severally and collectively engaging a driven member; springs circumferentially surrounding said cheeks and causing their engagement with the driven member, substantially as herein shown and described.

3. In a coupling, the combination with an integral member, a series of segmental coupling-cheeks surrounding said integral member, and a resilient band or bands circumferentially surrounding and normally maintaining said segmental member in close contact with said integral member but designed to be enlarged by and when said cheeks are acted upon centrifugally at high speeds, allowing said cheeks to disengage said integral member.

4. In a coupling, a driving clutch member having a series of segmental coupling-cheeks, a driven member, and a resilient band or bands circumferentially surrounding said cheeks, said cheeks surrounding and held in contact with said driven member by said bands, and designed to release said driven member when centrifugally acted upon by the high speed of said driving member.

In witness whereof I have hereunto set my hand in presence of two witnesses.

RICHARD PINTSCH.

Witnesses:
　WOLDEMAR HAUPT,
　HENRY HASPER.